(No Model.)
J. M. BUTCHER.
FLY TRAP.
No. 568,322. Patented Sept. 22, 1896.
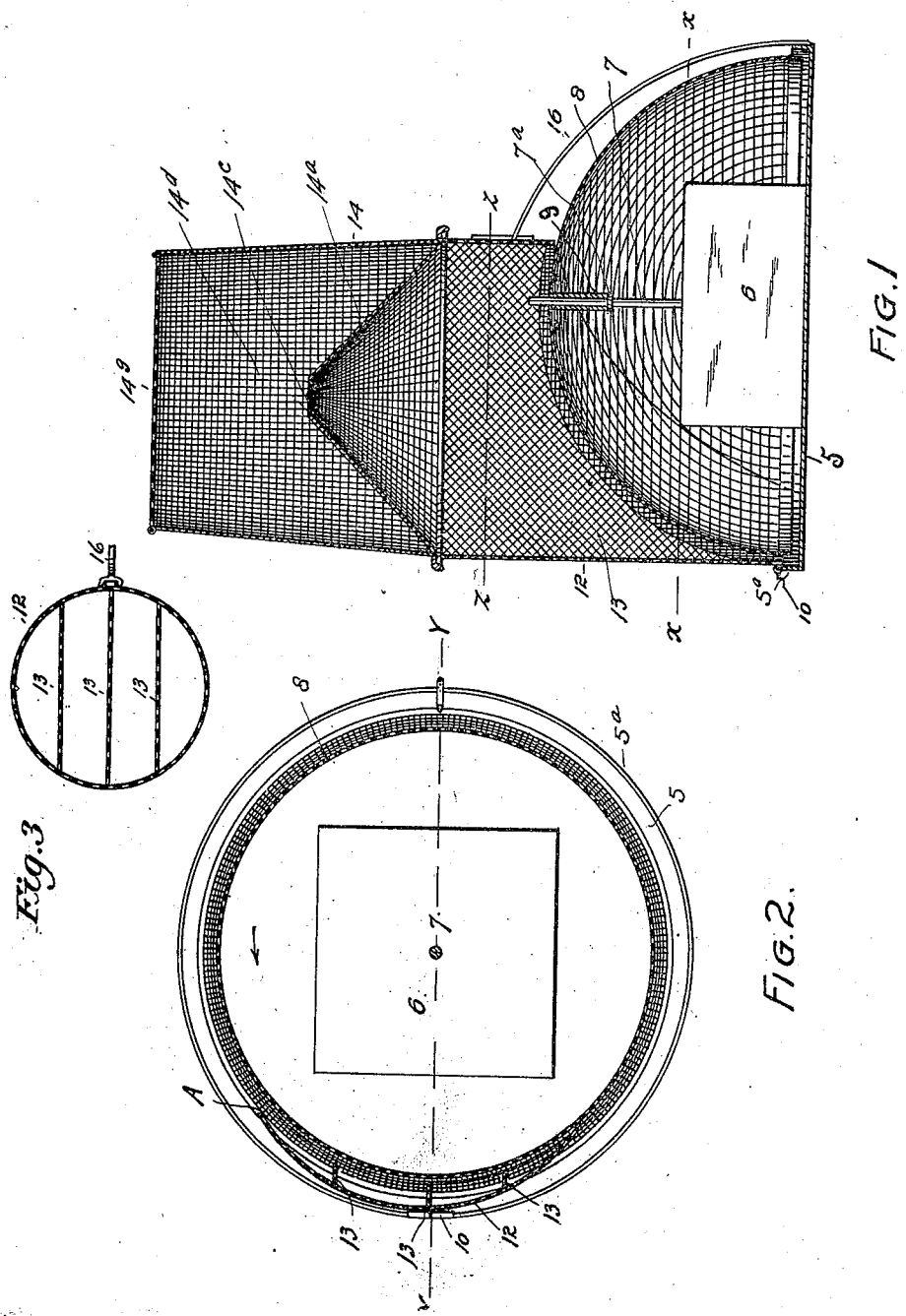
Witnesses
Inventor
J. M. Butcher
By his Attorney

UNITED STATES PATENT OFFICE.

JAMES M. BUTCHER, OF DENVER, COLORADO, ASSIGNOR OF ONE-HALF TO ALEXANDER HAMILTON, OF SAME PLACE.

FLY-TRAP.

SPECIFICATION forming part of Letters Patent No. 568,322, dated September 22, 1896.

Application filed May 20, 1896. Serial No. 592,325. (No model.)

*To all whom it may concern:*

Be it known that I, JAMES M. BUTCHER, a citizen of the United States of America, residing at Denver, in the county of Arapahoe and State of Colorado, have invented certain new and useful Improvements in Fly-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in fly-traps, my object being to provide a device of this class which shall be simple in construction, economical in cost, and reliable, durable, and efficient in use; and to these ends the invention consists of the features hereinafter described and claimed, all of which will be fully understood by reference to the accompanying drawings, in which is illustrated an embodiment thereof.

In the drawings, Figure 1 is a vertical longitudinal section taken through the device on the line $yy$, Fig. 2. Fig. 2 is a horizontal section taken on the line $xx$, Fig. 1. Fig. 3 is a section taken on the line $zz$, Fig. 1, shown on a smaller scale.

Similar reference-characters indicating corresponding parts in the views, let the numeral 5 designate a suitable base-plate having a circular flange $5^a$. Centrally located on this base-plate is a clock train or movement 6 or other suitable mechanism adapted to rotate a vertical post 7, upon which is mounted a semispherical wire cage 8, which revolves with and is actuated by the post 7. This cage has a central aperture in its top, surrounded by a depending sleeve 9, made fast to the cage and surrounding the post. The lower extremity of this sleeve rests on a shoulder $7^a$, formed on the post. The bottom of the cage is open, but its lower edge passes below the top of the flange $5^a$, and may be as near the base-plate as practicable without touching the same.

Hinged to the base-plate, as shown at 10, and occupying a position above the cage is the lower part 12 of the trap, composed of wire and provided with vertical partitions 13. To the top of this part 12 is applied the detachable part 14, which forms the trap proper. This part 14 has a conical bottom $14^a$, whose apex is cut off to form an opening $14^c$, communicating with the upper compartment $14^d$ of the trap, which is provided with a hinged top lid $14^e$.

The operation of the trap will now be described and is as follows: The part 12 of the device overlaps and covers a portion of the cage 8. One edge of the part 12 is considerably raised from the cage, as shown at A, while the other edge is as close to the cage as is practicable without touching or impeding its movement. The bait, as sugar or molasses, is placed inside the rotatable cage 8. In their endeavor to get at this bait the flies light upon the exposed portion of the moving cage and are carried under the raised edge of the part 12. However, as the other edge of the part 12 is so close to the cage that they cannot escape, they are brushed off and retained within the chamber of the part 12, which is divided into small compartments by the partitions 13. By reason of the limited space in these compartments the flies pass upward through the said compartments, thence into the cone $14^a$, and out through the opening $14^c$ in the top thereof, and into the chamber $14^d$ of the part 14, in which they are caught. When this part 14 becomes well filled, it may be easily detached for the purpose of destroying the flies. This may be done by plunging the part into hot water or in any other suitable manner. The lid 14 may then be opened and the dead flies thrown out, after which the part 14 is returned to its original position and the catching of the flies goes on.

If the space within the part 12 were not divided by the partitions, the flies would have a disposition to remain in the said part, as they would have room to fly around. However, by the use of the partitions the compartments are so limited that the flies immediately seek an avenue of escape, with the result heretofore described.

The part 12 is locked in the operative position by an arm 16, attached to the base at one extremity, the opposite extremity being detachably connected with the part 12 in any suitable manner.

Having described my invention, what I claim is—

1. In a fly-trap the combination with a suitable base of a rotatable post mounted thereon, the cage mounted on the said post, the part 12 suitably attached to the base and overlapping the cage, one edge of the part 12 being raised from the cage sufficiently to allow the flies to enter as the cage rotates, while the other edge is so close to the case as to prevent their exit, the part 12 being provided with one or more partitions, and the detachable part 14 having a conical bottom and a top adapted to open said bottom having an opening at its apex, and suitable means for actuating the post substantially as described.

2. In a fly-trap the combination with a suitable base of a rotatable post mounted thereon, the cage mounted on the post and adapted to rotate therewith, the part 12 overlapping a portion of the cage, a space being left between one edge of the part 12 and the cage to allow the flies, while riding on the cage, to enter the part 12, the other edge of the part 12 being made to approach the cage closely to prevent the escape of the flies, and the detachable part 14 occupying a position above the part 12, said part 14 having an apertured bottom and a top adapted to open as and for the purpose set forth.

In testimony whereof I affix my signature in the presence of two witnesses.

JAMES M. BUTCHER.

Witnesses:
 CHAS. E. DAWSON,
 ALFRED J. O'BRIEN.